Nov. 10, 1942.  J. F. LUHRS  2,301,898
CONTROL SYSTEM
Filed June 13, 1940
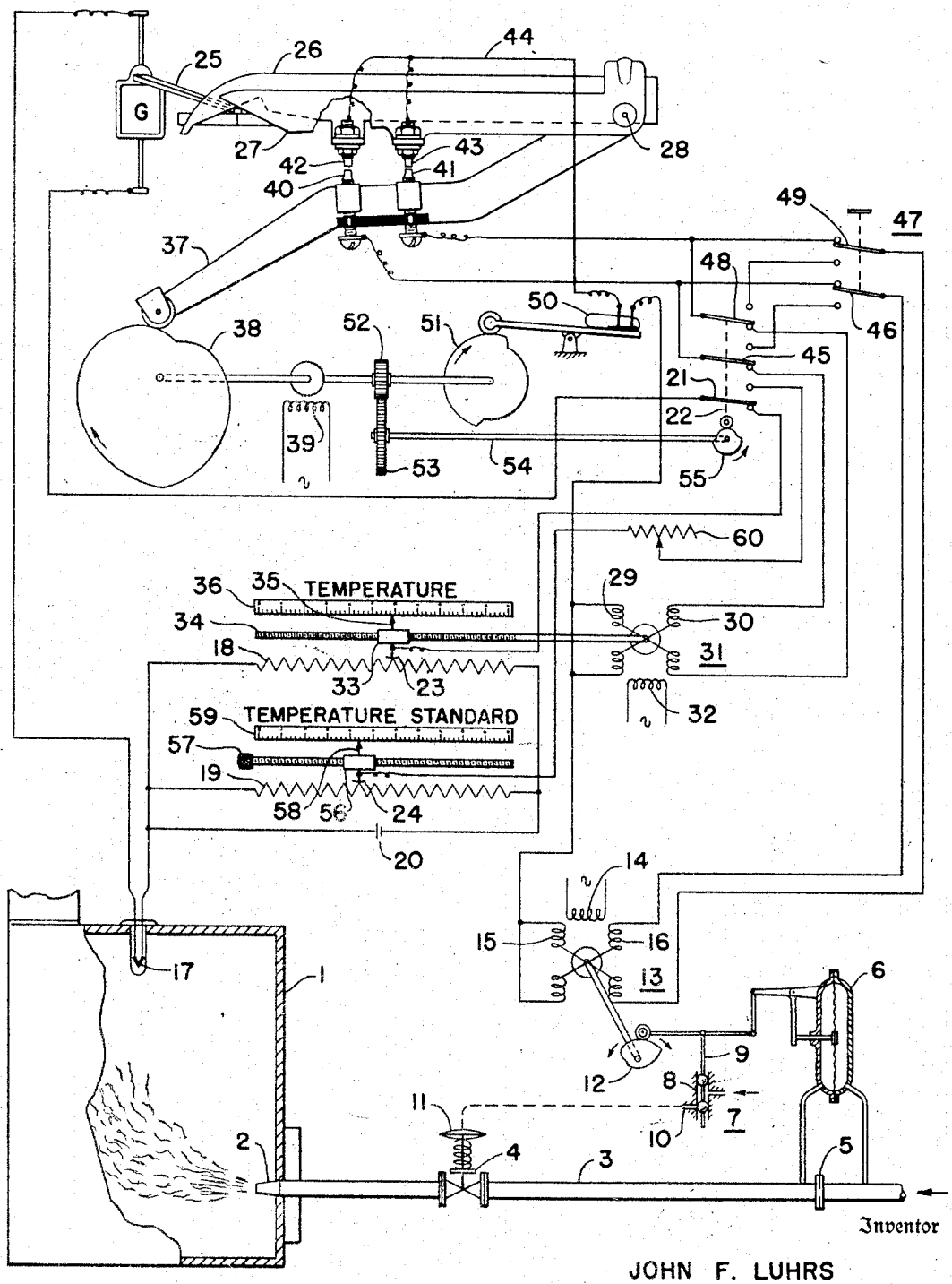
Inventor
JOHN F. LUHRS
By Raymond D. Junkins.
Attorney Patented Nov. 10, 1942

2,301,898

UNITED STATES PATENT OFFICE 2,301,898

CONTROL SYSTEM

John F. Luhrs, Cleveland Heights, Ohio, assignor to Bailey Meter Company, a corporation of Delaware Application June 13, 1940, Serial No. 340,412

7 Claims. (Cl. 236—70)

This invention relates to control apparatus for regulating the rate of application of a corrective agent to maintain a condition at a desired value.

One object of my invention is to provide a control system wherein the rate of application of the corrective agent is varied in accordance with the rate of change of the controlled condition and in accordance with the amount of departure of the controlled condition from a predetermined or desired value.

A further object is to provide a control system wherein the rate of application of the corrective agent is selectively varied alternately by an amount corresponding to the change in the controlled condition during a predetermined increment of time and by an amount corresponding to the amount of departure of the controlled condition from a predetermined or desired value.

A further object of my invention is to provide a control apparatus readily incorporated in or combined with a potentiometric type of instrument.

A further object of my invention is to provide a control apparatus of the potentiometric type wherein the corrective agent is alternately varied in a sense tending to prevent changes in the magnitude of the controlled condition and in a sense tending to restore the controlled condition to the desired value.

A further object of my invention is to provide a control apparatus of a potentiometric or null balance type wherein a deflecting member, such as the needle of a galvanometer, is alternately caused to deflect from a null position in accordance with the amount of change in the magnitude of the controlled condition over a predetermined increment of time and the amount of departure of the controlled condition from a predetermined or desired value, and the rate of application of a corrective agent adjusted in accordance with the deflections of the deflecting member.

A further object of my invention is to provide a control apparatus of the potentiometric type wherein a pneumatic pilot valve is periodically adjusted in accordance with the deflections of a galvanometer alternately deflecting in accordance with the amount of change in the controlled condition over a predetermined increment of time and the amount of departure of the controlled condition from the predetermined desired value.

Still a further object of my invention is to provide a control apparatus of the potentiometric type which acts to adjust the standard or control point of a constant flow control regulating the rate of application of a corrective agent.

In the drawing I have schematically illustrated my invention arranged to exhibit and to control the temperature within a furnace. It should be understood that I have so illustrated my invention merely by way of example, as it will be evident that in general it may be used to vary the rate of application of any corrective agent or agents to maintain a controlled condition at a predetermined or desired value.

Referring to the drawing, I therein show a furnace 1 which is supplied with a corrective agent, such as a combustible gas through a burner 2 and a supply pipe 3. Located in the pipe 3 is a regulating valve 4 by which the fuel flow to the furnace 1 may be varied to maintain the temperature therein at a predetermined or desired value. Normally the rate of application of the corrective agent is automatically maintained constant by means of a constant flow control comprising an orifice 5 disposed in the pipe 3, a differential pressure responsive device 6 responsive to the differential pressure produced by the orifice 5, and a pneumatic pilot valve generally indicated at 7, which is actuated by the responsive device 6 and acts to establish an air loading pressure for positioning the valve 4.

The pilot valve 7 may be of the type illustrated and described in United States Patent 2,054,464 to C. Johnson, and comprises a stationary valve body 8 and a relatively movable valve member 9. The valve body 8 is provided with a centrally located inlet port which may be connected with any suitable source of air under pressure. The air entering the pilot valve passes into a longitudinally located passageway past suitable lands secured to the valve member 9 and is exhausted to the atmosphere. The valve body 8 is also provided with an outlet port 10, the pressure in which will be determined by the position of the lower land on the movable valve member 9. As the valve member 9 moves downwardly the pressure established in the outlet port 10 will proportionately increase and conversely as the movable valve member 9 moves upwardly the pressure established in the outlet port 10 will decrease. The pressure so established in the outlet port is transmitted to a pressure sensitive servo-motor 11 for operating the valve 4. Assuming by way of example that the flow of fuel through the pipe 3 increases, the movable valve member 9 will be moved upwardly, thereby decreasing the loading pressure in the outlet port 10, and serving to position the valve 4 in a closing direction, thereby tending to return the flow of fuel to the desired rate. A decrease in fuel flow will serve to position the valve member 9 downwardly, thereby increasing the loading pressure effective on the servo-motor 11, positioning valve 4 in an opening direction and again serving to return the flow of fuel to the desired value.

The movable valve member 9 is also arranged to be positioned by a cam 12 which serves to establish the desired rate of fuel flow thereafter maintained by the constant flow control. In accordance with my invention the cam 12 is automatically positioned by means responsive to the temperature within the furnace 1 to maintain the temperature of the furnace at a predetermined or desired value. The constant flow control serves the purpose of correcting for changes in the rate of fuel flow, due to variations in fuel pressure, etc. before such changes cause undesirable changes in the temperature of the furnace. In general, it may be said that the temperature responsive apparatus acts to set the control point or standard of the flow control, and thereafter the flow control operates to maintain the actual rate of fuel flow at the control point or standard.

The cam 12 is positioned by a shaded pole motor 13 having an energizing winding 14 and opposed pole windings 15 and 16. When the winding 15 is energized by being short circuited, the motor 14 rotates in one direction, and when the winding 16 is energized by being short circuited the motor rotates in opposite direction. When both windings 15 and 16 are short circuited or open circuited together the motor remains stationary. I have shown the mechanical connections between the motor 13 and cam 12 diagrammatically, it being understood that suitable reducing gears, etc. may be employed so that the cam 12 is normally positioned between suitable angular limits of less than 360° over the operating range of the control apparatus. By means now to be described the pole windings 15 and 16 are selectively short circuited to effect rotation of the motor 13 in desired direction periodically alternately in accordance with the change in temperature within the furnace 1 over a predetermined increment of time, and in accordance with the departure of the temperature from a predetermined or desired value. The former operation acts to vary the rate of fuel flow to prevent a further change in temperature in the same direction, whereas the latter operation acts to maintain or restore the temperature within the furnace 1 to the predetermined or desired value. For example, assuming that the desired temperature within the furnace is 900° F., then upon a change in the actual temperature therein from 900° to 905° the proper pole winding of the motor 13 would be short circuited to effect rotation thereof so that the rate of fuel flow through the pipe 3 would be reduced proportionally to the increase in temperature. Assuming that the decrease in fuel flow was sufficient to prevent a further increase in temperature, thereafter periodically the proper pole winding of the motor 13 would be short circuited so that the fuel flow would be further reduced until the temperature was restored to the desired value of 900° F.

Selective control of the motor 13 is obtained by means of a potentiometric system wherein the E. M. F. generated by a thermocouple 17 sensitive to the temperature within the furnace 1 is alternately compared to the potential drop through adjustable portions of slide wires 18 and 19. The slidewires 18 and 19 are connected in parallel across a source of constant electromotive force 20. As will be well understood by those familiar with the art, suitable standardizing means may be provided whereby the electromotive force generated by the source 20 may be compared to that generated by a standard cell and suitable adjustments made in the potentiometer circuit to maintain a constant potential drop through the slide wires 18 and 19.

One lead of the thermocouple 17 is connected to the potentiometer circuit comprising the slide wires 18 and 19 and source 20, and the other lead of the thermocouple is connected to a galvanometer G and thence to a finger 21 of a cyclically operated switch 22. As shown, the finger 21 connects the galvanometer G with a contact 23 engaging the slide wire 18. Periodically the switch 22 lifts the finger 21 to connect the galvanometer G for a predetermined increment of time with a contact 24 engaging the slide wire resistance 19. With the switch 22 in the position shown, if the electromotive force generated by the thermocouple 17 is equal to the potential drop in that portion of the slide wire 18 determined by the position of the contact 23, then the movable or deflecting member 25 of the galvanometer G will remain in the mid or null position. If however the potential generated by the thermocouple 17 is greater than the potential drop through that portion of the slide wire 18, then the deflecting member 25 will deflect in one direction from the null position, and if less than the potential drop through that portion of the slide wire 18 the member 25 will deflect in opposite direction from the null position.

Periodically two feelers 26 and 27 pivoted at 28 determine the deflection of the member 25 from the null position, and effectively energize either the winding 15 or 16 of the motor 13, depending upon the sense of deflection of the member 25 from the null position, and for an increment of time corresponding to the amount of deflection of the member 25 from the null position. The feelers 26 and 27 also serve to control the energization of the pole windings 29 and 30 of an opposed shaded pole motor 31 having an energizing winding 32. With the switch 22 in the position shown, the windings 29 and 30 are connected in parallel with the windings 15 and 16 of the motor 13, so that either or both windings of the two motors may be simultaneously short circuited by operation of the feelers 26 and 27.

Operation of the motor 31 serves to adjust the contact 23 along the slide wire 18 in a direction to restore equality between the E. M. F. generated by the thermocouple 17 and the potential drop through that portion of the slide wire determined by the position of the contact 23. I have shown the connections between the motor 31 and contact 23 schematically, it being understood that any suitable mechanical arrangement may be used. By way of illustration I have shown the contact 23 carried by a block 33 threaded to a screw 34 rotated in either direction by the motor 31. As the length of the portion of resistance 18 necessary to balance the E. M. F. generated by the thermocouple 17 will be proportional to the temperature of the furnace 1, the block 33 may be provided if desired with an index 35, which in cooperation with a suitably graduated scale 36 will give a visual indication of the temperature within the furnace. It will, of course, be understood that any suitable form of exhibiting device, such as a recorder, might be employed in place of the indicating means schematically shown.

To provide periodic operation of the feelers 26 and 27 I provide a cam follower 37 pivoted at 28 and reciprocated through a predetermined cyclic course by means of a cam 38 continuously rotated in the direction indicated by the arrow by a motor 39. The cam follower 37 carries contacts 40 and 41 insulated from each other and which engage through a portion of each reciprocation of the follower 37 contacts 42 and 43 carried by the feelers 26 and 27 respectively. The contacts 40—42 and 41—43 also serve as pickups for the feelers, so that the latter are reciprocated from one limit determined by the rise of the cam 38, to another limit determined by the position of the member 25. If the member 25 is in the null position, then contacts 40—42 and 41—43 engage and disengage at the same instant. If the member 25 deflects to the left as shown in the drawing, then the contacts 40—42 will disengage prior to contacts 41—43 and engage after the latter have engaged. Conversely, if the member 25 deflects to the right from the null position, contacts 41—43 will disengage prior to contacts 40—42 and engage after the latter have engaged.

Contacts 42 and 43 are connected by a conductor 44 to the common or neutral of the pole windings 29, 30 and 15, 16 of motors 31 and 13 respectively. Contact 40 is connected through a finger 45 of switch 22 to the winding 30 of motor 31, and through a finger 46 of a manually operable switch 47 to the winding 16 of the motor 13. Contact 41 is connected through a finger 48 of switch 22 to the winding 29 of motor 31 and through a finger 49 of manually operable switch 47 to the winding 15 of motor 13. Accordingly, operation of contacts 40—42 and 41—43 will simultaneously control operation of the motors 13 and 31 with the switch 22 in the position shown.

With the member 25 in the null position as shown, the cam rotates in a clockwise direction contacts 40—42 and 41—43 will simultaneously engage so that windings 29, 30 of motor 31 and 15, 16 of motor 13 will be all simultaneously energized and the motors remain stationary. After the contacts 40—42 and 41—43 have engaged, the feelers 26 and 27 will be lifted from the member 25 so that it will be free to deflect in one direction or the other from the null position in accordance with any difference between the E. M. F. generated by the thermocouple 17 and the potential drop through that portion of the slide wire 18 determined by the position of the contact 23. Just prior to the feelers 26 and 27 reaching the point of maximum rise, the opposed windings of motors 13 and 31 are simultaneously deenergized by means of a mercury switch 50 disposed in the conductor 44 and actuated by a cam 51 rotated by the motor 39 in proper relationship to the cam 38, so that the windings of motors 13 and 31 will remain deenergized throughout the movement of the feelers 26 and 27 toward the member 25 and until just after the follower 37 begins to move in a clockwise direction. The inclusion of the switch 50 to maintain the windings of the motors 13 and 31 deenergized through a portion of each cycle facilitates the operation of the device and makes it possible to shape the falling section of the cam 38 as may be desired to give proper motion to the feelers 26 and 27.

Assuming now that because of a change of temperature within the furnace 1 the member 25 deflects from the neutral position, then the follower 37 would cause either contacts 40—42 or 41—43 to engage first, depending upon the sense of the deflection of the member 25 from the null position. The increment of time between the engagement of the contacts first engaging and those last engaging would be proportional to the amount of deflection of the member 25 from the null position by virtue of the shape of the rising section of cam 38 and the fact that the motor 39 rotates at substantially constant speed. While one or the other of the pairs of contacts 40—42 and 41—43 are solely engaged, one or the other of the windings of the motors 31 and 13 would be short circuited so that both motors would rotate in selected direction for an increment of time corresponding to the deflection of the member 25. Operation of the motor 31 would position the contact 23 along the slide wire 18 in a direction to restore correspondence between the electromotive force generated by the thermocouple 17 and the potential drop through that portion of the slide wire resistance 18 determined by the position of the contact 23. Rotation of the motor 13 would serve to adjust the control point or standard of the flow control to vary the rate of fuel flow to the furnace 1 in a direction to prevent a further change in temperature within the furnace in the same direction as causing the original deflection of the member 25.

It will be noted that the control thus far described maintains a certain rate of fuel flow to the furnace 1 for each and every temperature therein and does not directly act to restore the temperature to the desired value after departure therefrom. Such a control is commonly known as a "positioning" or "geared" control in that it may be said, figuratively speaking, that the rate of fuel flow is "geared" to the temperature within the furnace. Such a control is inherently stable, in that it does not tend to cause cyclic variations in the temperature within the furnace 1 above and below the desired standard. In some instances, however, it is not entirely desirable for the reason that the temperature within the furnace 1 will not be maintained precisely at a predetermined or desired value, but will vary therefrom, depending upon the load on the furnace. In order to retain the desirable features of this type of control and at the same time maintain or return the actual temperature within the furnace 1 to the desired value, I combine with the control described, a type of control commonly known as a "floating" control, which is characterized by the fact that whenever the actual temperature is other than that desired the rate of application of the corrective agent is varied in a direction tending to restore the temperature to the desired value. By combining the two types of control into an integrated system I obtain the stable action of the "positioning" or "geared" control and at the same time maintain or restore the actual temperature precisely to the desired value.

I obtain the "floating" effect by cyclically comparing the E. M. F. generated by the thermocouple 17 to one corresponding to that produced by the thermocouple 17 when the temperature within the furnace 1 is at the predetermined or desired value; and positioning the cam 12 for a time increment corresponding to the difference between the E. M. F.'s. In particular, the apparatus shown in the drawing is arranged so that during alternate cycles of operation of the cam 38 the E. M. F. generated by the thermocouple 17 is compared to the potential drop through that portion of the slide wire resistance 18 determined by the position of the contact 23, and the motors 13 and 31 operated for a time increment corresponding to the difference between these E. M. F.'s. During cycles of the cam 38 succeeding these alternate cycles the E. M. F. generated by the thermocouple 17 is compared to the potential drop through that portion of the slide wire resistance 19 determined by the position of the contact 24 and the motor 13 solely operated for a time increment corresponding to the difference between these E. M. F.'s.

Referring to the drawing, it will be observed that the switch 22 is operated by the motor 39 through gears 52, 53, shaft 54 and cam 55. The gears 52—53 may be so designed that for one revolution of the cam 38 fingers 21, 45 and 48 of the switch 22 are in the position shown, and for the next revolution of the cam 38 the said fingers are positioned upwardly so that the galvanometer G is connected to the contact 24, and the windings 29 and 30 of the motor 31 disconnected from contacts 40 and 41. With the switch fingers 21, 45 and 48 in the latter position, the E. M. F. generated by the thermocouple 17 will be compared to the potential drop through that portion of the slide wire 19 determined by the position of the contact 24. If these E. M. F.'s are equal then the galvanometer member 25 will remain in the null position and windings of motor 13 will be simultaneously energized and deenergized. If, however, these E. M. F.'s are unequal, then the member 25 will be selectively deflected from the null position by an amount corresponding to the difference. Operation of the feelers 26 and 27 in manner heretofore described will then effectively energize either the winding 15 or 16 of the motor 13 to effect positioning of the cam 12 in desired direction. The amount and direction of such positioning will depend upon the sense of E. M. F. unbalance and will vary the control point of the flow control so that the rate of fuel flow is adjusted in a direction to restore the temperature within the furnace 1 to the desired value.

As shown, the contact 24 is preferably carried by a manually positionable device so that the control may be adjusted to maintain any temperature desired within the furnace 1. In the specific embodiment of my invention illustrated I have shown the contact 24 carried by a block 56 threaded to a screw 57 which may be manually rotated to position the contact 24 along the slide wire 19. Conveniently the block 56 may be provided with an index 58, which in cooperation with a suitably graduated scale 59 will give a visual indication of the standard for which the temperature control is adjusted.

To provide a means for adjusting the relative influence of the "positioning" and "floating" effects I provide a manually adjustable rheostat 60 in the connector between the galvanometer G and contact 24 so that the deflection of the member 25 for a given difference between the E. M. F. generated by the thermocouple 17 and that produced by the portion of the slide wire 19 determined by the position of the contact 24 may be adjusted to the particular characteristics of any specific application. It will be appreciated by those familiar with the art in some instances it may be desirable to have the "floating" effect predominate over the "positioning" effect, whereas in other instances, depending upon the characteristics of the apparatus to which the control system is applied, it may be desirable to have the "positioning" effect predominate over the "floating" effect. Increasing the resistance of the manually adjustable rheostat 60 will lessen the deflection of the member 25 produced by a given difference in electromotive force between that produced by the thermocouple 17 and that portion of the slide wire 19 determined by the position of the contact 24 so that the time increment of operation of the motor 13 is correspondingly lessened and the rate of fuel flow changed by a proportionately smaller amount.

With some types of apparatus it may even be desirable to have the control point or standard of the flow control adjusted solely by the "floating" effect; and to permit of such operation the manually operable switch 47 is provided so that during the cycle of operation when the E. M. F. of the thermocouple 17 is compared to that through the portion of the slide wire 18 determined by the position of the contact 23 the pole windings of the motor 13 are disconnected from the system so that regardless of the deflection of the member 25 no change in the rate of fuel flow occurs. During the cycle of operation when the E. M. F. of the thermocouple 17 is compared to that through the portion of the slide wire 19 determined by the position of the contact 24, the pole windings 15 and 16 are connected to the contacts 40 and 41, so that deflections of the member 25 from the null position effect corresponding operation of the motor 13 and consequent variation in the rate of fuel flow to the furnace. With the manually operated switch 47 so adjusted, the motor 31 will still operate to position the contact 23 along the slide wire 18, so that the temperature within the furnace 1 will still be exhibited by the index 35 and cooperating scale 36.

While I have illustrated the invention as relating particularly to the measurement of temperature and the use of thermocouples, still I contemplate the arrangement may be utilized for the measurement and control of other variables or characteristics in the operation of apparatus, and which may be of physical, chemical, thermal, electrical, or other nature. Such variables may be flow, temperature, pressure, or ratio of variables, etc.

While in the description for the sake of simplicity and clearness I have used the term "slide wire," it is to be understood that I include in this term any variable resistance capable of performing the same function.

So far as the feeler mechanism is concerned, it is not necessary that the movable member 25 be operated by a galvanometer but such member might be positioned by a Bourdon tube sensitive to pressure or temperature, or by the indicator arm of a fluid flow meter, or by any similar device having a relatively small available power which it is desired to use for recording, indicating and/or controlling therefrom, and wherein electrical effects may be produced in amplified form of constant magnitude, but of duration or for a percentage of the period of operation depending upon the amount of departure of the variable from a predetermined value.

While I have illustrated and described a preferred embodiment of my invention, it is to be understood that I am not to be limited thereby except as to the claims in view of prior art.

What I claim as new, and desire to secure by Letters Patent of the United States, is:

1. In combination with a heated device and means for supplying a heating element thereto, thermosensitive means for producing a potential representative of the temperature of said device, means for regulating the rate of supply of said heating element, control means for said regulating means comprising a first electric motor, a second electric motor, means for producing a potential representative of the position of said second motor, adjustable means for producing a potential corresponding to the potential produced by said thermal sensitive means when the temperature of said device is at the desired value, means for controlling during alternate periods of time said first and second motors in accordance with the difference between the potential produced by said thermal sensitive means and the potential representative of the position of said second motor, and during periods succeeding said alternate periods controlling said first motor in accordance with the difference between the potential produced by said thermal sensitive means and said adjustable means.

2. In combination with a heated device and means for supplying a heating element thereto, thermal sensitive means for producing a potential representative of the temperature of said device, means for regulating the rate of supply of said heating element, control means for said regulating means comprising a first electric motor, an indicator, means for producing a potential representative of the position of said indicator, operating means for said indicator comprising a second electric motor, adjustable means for producing a potential corresponding to the potential produced by said thermal sensitive means when the temperature of said device is at the desired value, and means for controlling during alternate periods of time said first and second motors in accordance with the difference between the potential produced by said thermal sensitive means and the potential representative of the position of said indicator, and during periods succeeding said alternate periods controlling said first motor in accordance with the difference between the potential produced by said thermal sensitive means and said adjustable means.

3. In combination with a heated device and means for supplying a heating element thereto, thermal sensitive means for producing a potential representative of the temperature of said device, means for regulating the rate of supply of said heating element, control means for said regulating means comprising a first electric motor, a second electric motor, means for producing a potential representative of the position of said second motor, adjustable means for producing a potential corresponding to the potential produced by said thermal sensitive means when the temperature of said device is at the desired value, cyclically operable means for producing during alternate cycles an electric impulse of time length corresponding to the difference between the potential produced by said thermal sensitive means and the potential representative of the position of said second motor, and during cycles succeeding said alternate cycles an electric impulse of time length corresponding to the difference between the potential produced by said thermal sensitive means and said adjustable means, and switching means for energizing both said motors with the electric impulses originated during alternate cycles, and said first motor solely by said impulses originated during cycles succeeding said alternate cycles.

4. In combination with a heating device and means for supplying a heating medium thereto, thermal sensitive means for producing a potential representative of the temperature of said device, means for regulating the rate of supply of said heating medium, control means for said regulating means comprising a first electric motor, a second electric motor, means for producing a potential representative of the position of said second motor, adjustable means for producing a potential corresponding to the potential produced by said thermal sensitive means when the temperature of said device is at the desired value, means for concurrently energizing said first and second motors during alternate periods of time, the periods of energization being a function of the difference between the potential produced by said thermal sensitive means and the potential representative of the position of said second motor, and for energizing said first mentioned motor only during periods succeeding said alternate periods, the periods of energization of said first motor being a function of the difference between the potential produced by said thermal sensitive means and said adjustable means.

5. In combination with a heated device and means for supplying a heating medium thereto, thermal sensitive means for producing a potential representative of the temperature of said device, means for regulating the rate of supply of said heating medium, control means for said regulating means including a first motor, a potentiometric system having two resistance branches, and including a source of potential and a pair of resistors connected in parallel across said source, a second motor, means periodically operable by said second motor for adjusting one branch of said potentiometric system in accordance with the temperature existing in said device, means for adjusting the other branch of said potentiometric system to produce a potential corresponding to that produced by said thermal sensitive device when said heating device is at the desired temperature, means connecting the thermal sensitive means to the two resistor elements in parallel and in opposition to said source, a galvanometer, and cyclically operable switch means for periodically connecting the galvanometer alternately to the two resistor branches of said potentiometric system, means for producing current impulses of time durations corresponding to the magnitude of deflection of the galvanometer, means for energizing concurrently said first and second motors by the impulse produced when the galvanometer is connected to said first resistor branch, means for energizing said first motor only by the impulse produced when the galvanometer is connected to said second resistor branch, and means for rendering said first and second motors directionally responsive to deflection of the galvanometer in opposite directions.

6. In combination with a heated device and means for supplying a heating medium thereto, thermal sensitive means for producing a potential representative of the temperature of said device, means for regulating the rate of supply of said heating medium, control means for said regulating means comprising a first electric motor, a first potentiometer adjustable to produce a potential corresponding to that of said thermal sensitive device when the temperature of said heating device is at the desired value, a second potentiometer adjustable to produce a potential corresponding to the existing potential of said thermal sensitive device, a second electric motor for adjusting said second potentiometer, means responsive to variations in the potential produced by said thermal sensitive device for concurrently energizing said motors to adjust said second potentiometer in accordance with the existing potential of said thermal sensitive device and to adjust the rate of supply of said heating medium, and means responsive to the amount of departure or the temperature of said heated device from the desired temperature for energizing said first motor only to vary the rate of supply of said heating medium.

7. In combination with a heated device and means for supplying a heating medium thereto, thermal sensitive means for producing a potential representative of the temperature of said device, means for regulating the rate of supply of said heating medium, control means for said regulating means comprising a first electric motor, a first potentiometer adjustable to produce a potential corresponding to that of said thermal sensitive device when the temperature of said heating device is at a desired value, a second potentiometer adjustable to produce a potential corresponding to that of said thermal sensitive device, a second motor for adjusting said second potentiometer, a source of current common to said potentiometers, means for connecting said thermal sensitive device to said potentiometers in opposition to said source, a galvanometer, and means for periodically connecting said galvanometer to said first and second potentiometers alternately, and means responsive to deflections of said galvanometer when connected to said first potentiometer for energizing said first motor only, and for concurrently energizing said first and second motors when connected to said second potentiometer, and means for rendering said motors directionally responsive to deflections of the galvanometer in opposite directions.

JOHN F. LUHRS.